(12) United States Patent
Mauk et al.

(10) Patent No.: US 9,169,396 B2
(45) Date of Patent: Oct. 27, 2015

(54) POLYMER-BOUND WEB AS WELL AS METHOD FOR ITS PRODUCTION

(75) Inventors: Hanns Joerg Mauk, Mundelsheim (DE); Bernhard Voith, Ottenbach (DE); Bernd Fischer, Murr (DE); Karl-Heinz Peter Scholz, Hoesbach (DE)

(73) Assignees: TPS TechnoPartner Samtronic GmbH, Goeppingen (DE); Karl-Heinz Peter Scholz, Hoesbach (DE)

( * ) Notice: Subject to any disclaimer, the term of this patent is extended or adjusted under 35 U.S.C. 154(b) by 225 days.

(21) Appl. No.: 12/930,864

(22) Filed: Jan. 19, 2011

(65) Prior Publication Data

US 2012/0183727 A1    Jul. 19, 2012

(51) Int. Cl.
*B32B 3/10*   (2006.01)
*C08L 97/00*  (2006.01)
*G06F 19/00*  (2011.01)

(52) U.S. Cl.
CPC .............. *C08L 97/007* (2013.01); *G06F 19/00* (2013.01); *Y10T 428/24355* (2015.01)

(58) Field of Classification Search
CPC ........... E04F 15/00; E04F 15/02; E04F 15/16; E04F 15/20; E04B 1/86
USPC ........................................................ 428/141
See application file for complete search history.

(56) References Cited

U.S. PATENT DOCUMENTS

| | | | |
|---|---|---|---|
| 4,606,963 A * | 8/1986 | Farrell | 428/150 |
| 4,897,302 A * | 1/1990 | Bull | 442/395 |
| 5,584,950 A | 12/1996 | Gaffigan | |
| 6,077,613 A | 6/2000 | Gaffigan | |
| 6,217,700 B1 | 4/2001 | Knobel | |
| 6,803,099 B1 * | 10/2004 | Anspach | 428/343 |
| 2002/0045710 A1 * | 4/2002 | Nishihara et al. | 525/191 |
| 2005/0113499 A1 * | 5/2005 | Tamcke et al. | 524/270 |
| 2005/0223664 A1 * | 10/2005 | Gardner | 52/235 |
| 2007/0172629 A1 * | 7/2007 | Dodge | 428/90 |
| 2014/0088211 A1 * | 3/2014 | Hayashi et al. | 521/59 |

FOREIGN PATENT DOCUMENTS

| | | |
|---|---|---|
| DE | 1 055 218 | 4/1959 |
| DE | 694 08 273 | 5/1998 |
| DE | 197 24 296 | 12/1998 |
| DE | 197 51 516 | 5/1999 |
| DE | 199 01 022 | 7/2000 |
| DE | 100 07 347 | 9/2001 |
| DE | 100 04 763 | 12/2001 |
| DE | 202 14 622 | 3/2003 |
| DE | 103 11 894 | 10/2004 |
| DE | 103 16 695 | 10/2004 |
| DE | 10 2007 063 261 | 6/2009 |

* cited by examiner

*Primary Examiner* — Maria Veronica Ewald
*Assistant Examiner* — Laura Auer
(74) *Attorney, Agent, or Firm* — Collard & Roe, P.C.

(57) ABSTRACT

The invention relates to a method for the production of a web composed essentially of a granulate and a polymer. In order for the web to have good suction against the substrate after it has been laid on a floor, the interstices between the granulate particles are not allowed to be filled with the polymer. According to the invention, this is brought about in that the polymer is applied to the top side of the granulate. After the polymer melts, the polymer seeps down through the granulate. By means of targeted control or regulation, this sinking process is influenced before the polymer reaches the underside of the web. The invention also comprises a sensor and the product as such.

9 Claims, 2 Drawing Sheets

Figure 2:
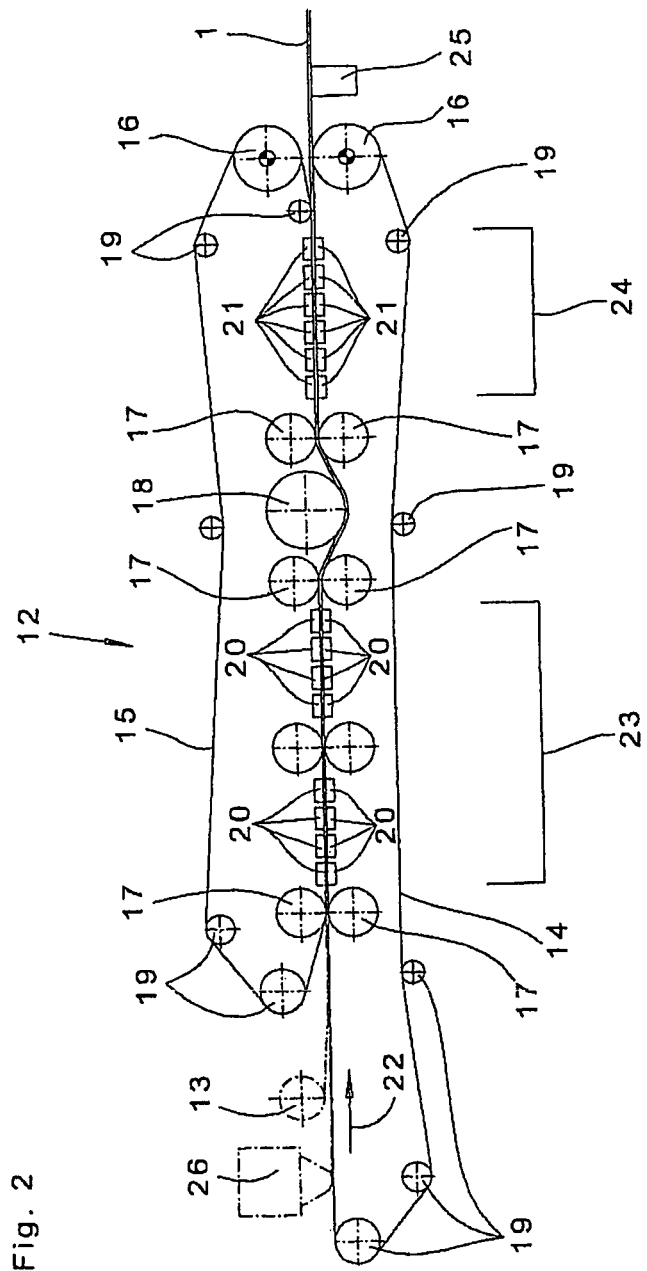

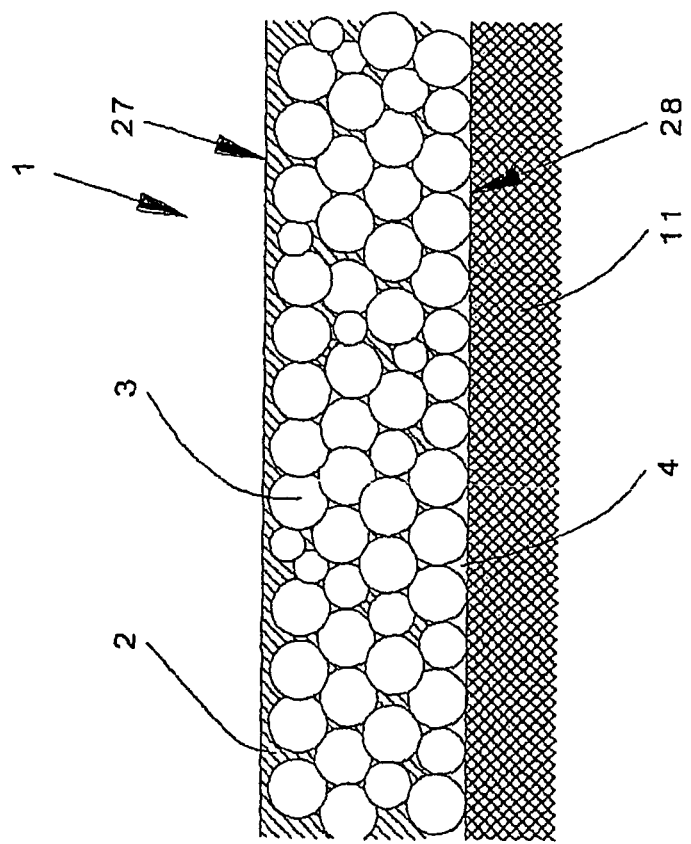
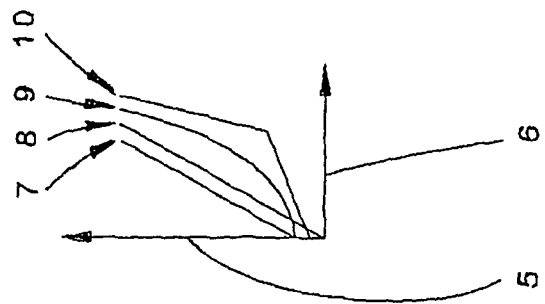

POLYMER-BOUND WEB AS WELL AS METHOD FOR ITS PRODUCTION

The invention relates to a method according to the preamble of claim 1, a sensor according to claim 5, and a web according to the preamble of claim 8.

From the state of the art, methods are known by means of which granulates are heated, pressed, and then cooled, between two circulating belts, in a thermoplastic production method. Also, it is known that non-meltable granulates are connected with one another to form a web, using a meltable polymer. As references in this regard, the documents DE 197 51 516 C2 and DE 103 16 695 B4 will be mentioned.

In these production methods, a granulate (or also fibers, agglomerates, and mixtures of these) are spread out between an upper and a lower circulating belt. The belts are first heated from their outsides, thereby causing the granulate to become plastic to viscous. Because their belts come closer and closer to one another during the further course of the production process, in other words their movement, the granulate, which has made a transition into the flow-capable state, is compacted more and more, and a smooth, cohesive web is formed. In this connection, compaction takes place also by means of the heating elements that lie against the outside of the belts. During the further course of production, there are cooling elements, in turn, that also lie against the belts. At the end of the production machine, the web that is formed in this manner is then wound up onto a reel, or individual panels are cut off and stacked.

There are also granulates that are not meltable in themselves, but can be connected with one another, on a production machine that has already been mentioned, by means of a meltable material. This meltable material is then a polymer, or another polymer material, or also any other meltable material, but this will always be referred to as a polymer here.

Cork will be mentioned here as an example of a non-meltable granulate. When the cork granulate is connected by means of a polymer, the liquefied polymer sinks into the gaps between the granulate, whereby the flow velocity is controlled predominantly by the process temperature progression, the spreading density, the particle size distribution of the granulate, and the thermal viscosity behavior of the polymer.

In the case of webs that are used as carpeting, a certain self-adhesion of the web on the substrate is desired. When the web is laid, a person skilled in the art therefore also speaks of a suction effect. However, if the pores—for example in the case of a web composed of cork granulate—are filled with the polymer all the way to the underside of the web, then the suction effect does not exist or is greatly reduced. This is explained by the fact that no small air chambers are present on the underside of such a web, between the granulate and in the granulate. When the web is laid, and during the subsequent contact pressure, the air chambers are emptied as the result of the inherent weight of the web and/or as the result of a top load, whereby a small vacuum can occur due to the elasticity of the surrounding material and the related recovery.

It is therefore the task of the invention to find a method and a web in which a granulate is bound by means of a polymer, but demonstrates the suction effect.

This task is accomplished in that the polymer is applied to the granulate at the top (as a polymer film, nonwoven, fibers, powder, or also a combination of these). In this connection, the sinking process of the liquid polymer is very precisely controlled or regulated, so that open pores remain on the underside of the web.

In an embodiment of the invention, the parameters of production, such as the production velocity, for example (in other words the velocity of the belts of the production machine), web thickness, granulate size, polymer amount per square meter, polymer temperature, polymer viscosity at this temperature, and production pressure of the belts, are determined by means of comprehensive measurement series and then set in the controller of the machine.

In a further embodiment of the invention, the sinking process—and thus the presence of the air interstices between the lower granulate—is regulated. However, this is only possible using a sensor that provides the required reference variable. Within the scope of the present invention here, a sensor was also found with which one can measure the suction effect. According to the invention, the sensor is held against the underside of the web with an opening. The opening then has either excess pressure or a partial vacuum applied to it. The deviation from the experimentally determined pressure is measured and is then a measure of the suction effect and thus the reference variable of the regulation.

In another embodiment of the sensor, an infrared detector is used, which continuously measures the concentration of the polymer on the underside of the web.

A web that is produced using the method according to the invention is characterized in that a gradient of the polymer content occurs, from the top side of the web to the underside of the web. In this connection, one also speaks of a polymer gradient. It is maximal at the top side of the web, while it decreases toward the underside of the web. Ideally, the polymer is allowed to seep through the granulate only so far that the lower particles are just wetted at their surface, so that they cannot fall out of the organized structure of the web.

In a further embodiment of the invention, the granulate does not consist of cork—or another non-thermoplastic material—but rather of an elastomer material, such as rubber, for example.

However, within the scope of the invention, the web according to the invention does not have to consist only of the granulate and the polymer. Additional other materials can also be affixed at the top side of the web. For example, a further thermoplastic layer can be disposed there. Furthermore, pre-finished flat structures made of thermoplastic or non-thermoplastic material can also be disposed there. These tiles can be laid onto the polymer by means of a handling system, before running in between the two belts of the production machine. For example, ceramic panels, ceramic tiles, and also felt panels can be laid on in this way.

The web according to the invention is also characterized in that its underside is not completely even. This unevenness balances out small uneven areas of a floor or of another substrate. Furthermore, the suction effect is also reinforced by the unevenness. A surface roughness of 0.1 to 1.5 mm is advantageous. However, a surface roughness of 0.2 to 0.6 mm is particularly advantageous. This roughness is also advantageous for noise insulation.

In the following, the invention will be explained in greater detail using the figures. These show:

FIG. 1a a cross-section through a web according to the invention;

FIG. 1b a diagram with different gradient progressions;

FIG. 2 a production machine having a sensor according to the invention at the end of the production machine.

In FIG. 1a, a web 1 lying on a floor 11 can be seen, in a sectional view. A granulate 3 lies in multiple layers, one on top of the other. At the top side 27 of the web 1 and in air-filled interstices 4 between the particles of the granulate 3, there is a polymer 2. However, no polymer 2 is present on the underside 28 of the web 1.

The diagram of FIG. 1b, disposed next to FIG. 1a, has been set to the height of the underside 27 of the web 1 from FIG. 1a with its coordinate origin. The axis 5 represents the web thickness, while the axis 6 indicates the polymer content. The curves 7 to 10 show four different possible gradient progressions. The gradient progression 7 shows a linear relationship of the polymer content over the thickness of the web 1, whereby the curve does not pass through the coordinate origin. In other words, no polymer is present in the bottommost region of the web. The curve 8 shows a rather unrealistic gradient, since a polymer content with the value zero precisely at the underside 28 will be very difficult to implement. The curve 9 has a parabolic progression, whereby here again, the zero point does not pass through the coordinate origin. Another possible gradient progression is shown by the curve 10. Here one can see that while the polymer content is linear in certain sections, it is nevertheless provided with a bending point.

In the case of the production machine 12 shown merely as an example in FIG. 2, a granulate 3 is applied between an upper belt 15 and a lower belt 14, by means of a spreader 26. A woven polymer textile or a polymer film is furthermore applied to the granulate 3, by means of a dispenser 13. If polymer fibers are supposed to be applied to form the web 1 according to the invention, then another spreader 26 can also be disposed at this location of the machine. During the further course of web production, the belts 14, 15 move along a production direction 22. The granulate 3 and the polymer 2 are pressed by means of pressing rollers 17, heated by heating elements 20 in a heating zone 23, and cooled again by cooling elements 21 in a cooling zone 24. An immersion roller 18—for so-called ventilation of the web 1—is only shown optionally here. At the end of the production machine 12, the sensor 25 is situated below the web 1. The sensor 25 must be disposed at the end in the case of this type of machine, because that is the first location where the finished web 1 is no longer covered by a lower belt 14. The sensor 25 is very helpful for the present invention, because then precise regulation of the sinking process of the liquid polymer 2 into the granulate 3 can be implemented.

REFERENCE SYMBOL LIST 1 web; granulate/polymer layer
2 polymer
3 granulate
4 air-filled interstice
5 coordinate of the web thickness
6 coordinate of the polymer content
7 gradient progression linear with offset
8 gradient progression linear without offset
9 gradient progression parabolic with offset
10 gradient progression stepped with offset
11 floor/substrate
12 production machine
13 dispenser
14 lower belt
15 upper belt
16 drive roller
17 pressing roller
18 immersion roller
19 deflection roller
20 heating element
21 cooling element
22 production direction
23 heating zone
24 cooling zone
25 sensor
26 spreader
27 top side
28 underside

The invention claimed is:

1. A floor covering comprising a thermoplastic granulate and a polymer forming a granulate/polymer layer with the polymer binding the thermoplastic granulate,
    wherein the content of the polymer at an underside of the granulate/polymer layer is essentially zero,
    wherein the content of the polymer is maximal at a top side of the granulate/polymer layer,
    wherein the content of the polymer in the thermoplastic granulate has a gradient from the top side to the underside of the floor covering, the gradient comprising a continual decrease of the content of the polymer in the granulate/polymer layer starting from a top side of the floor covering and ending at an underside of the floor covering,
    wherein particles of the thermoplastic granulate arranged at the underside of the granulate/polymer layer each have downward surfaces pointing towards the underside of the granulate/polymer layer and not connected with the polymer,
    wherein at least one further layer firmly connected with the granulate/polymer layer is disposed above the granulate/polymer layer, and
    wherein the at least one further layer consists of thermoplastic material.

2. The floor covering according to claim 1, wherein the thermoplastic granulate consists essentially of an elastomer material.

3. The floor covering according to claim 2, wherein the elastomer material consists of rubber.

4. The floor covering according to claim 1, wherein the thermoplastic material of the at least one further layer consists of individual panels.

5. The floor covering according to claim 1, wherein the underside of the granulate/polymer layer has a surface roughness of 0.1 to 1.5 mm.

6. The floor covering according to claim 5, wherein the underside of the granulate/polymer layer has a surface roughness of 0.2 to 0.6 mm.

7. The floor covering according to claim 1, wherein, via the particles of the thermoplastic granulate at the underside, the floor covering produces a suction effect at the underside when the underside of the floor covering is placed on a floor.

8. A floor covering comprising a cork granulate and a polymer forming a granulate/polymer layer with the polymer binding the cork granulate,
    wherein the content of the polymer at an underside of the granulate/polymer layer is essentially zero,
    wherein the content of the polymer is maximal at a top side of the granulate/polymer layer,
    wherein the content of the polymer in the cork granulate has a gradient from the top side to the underside of the floor covering, the gradient comprising a continual decrease of the content of the polymer in the granulate/polymer layer starting from a top side of the floor covering and ending at an underside of the floor covering, and
    wherein particles of the cork granulate arranged at the underside of the granulate/polymer layer each have downward surfaces pointing towards the underside of the granulate/polymer layer and not connected with the polymer.

9. A floor covering comprising a thermoplastic granulate and a polymer forming a granulate/polymer layer with the polymer binding the thermoplastic granulate,
- wherein the content of the polymer at an underside of the granulate/polymer layer is essentially zero,
- wherein the content of the polymer is maximal at a top side of the granulate/polymer layer,
- wherein the content of the polymer in the thermoplastic granulate has a gradient from the top side to the underside of the floor covering, the gradient comprising a continual decrease of the content of the polymer in the granulate/polymer layer starting from a top side of the floor covering and ending at an underside of the floor covering,
- wherein particles of the thermoplastic granulate arranged at the underside of the granulate/polymer layer each have downward surfaces pointing towards the underside of the granulate/polymer layer and not connected with the polymer,
- wherein at least one further layer firmly connected with the granulate/polymer layer is disposed above the granulate/polymer layer, and
- wherein the at least one further layer consists of ceramic panels.

* * * * *